(No Model.) 2 Sheets—Sheet 1.
C. H. HELMS.
SEAM TRIMMING MACHINE.
No. 345,303. Patented July 13, 1886.
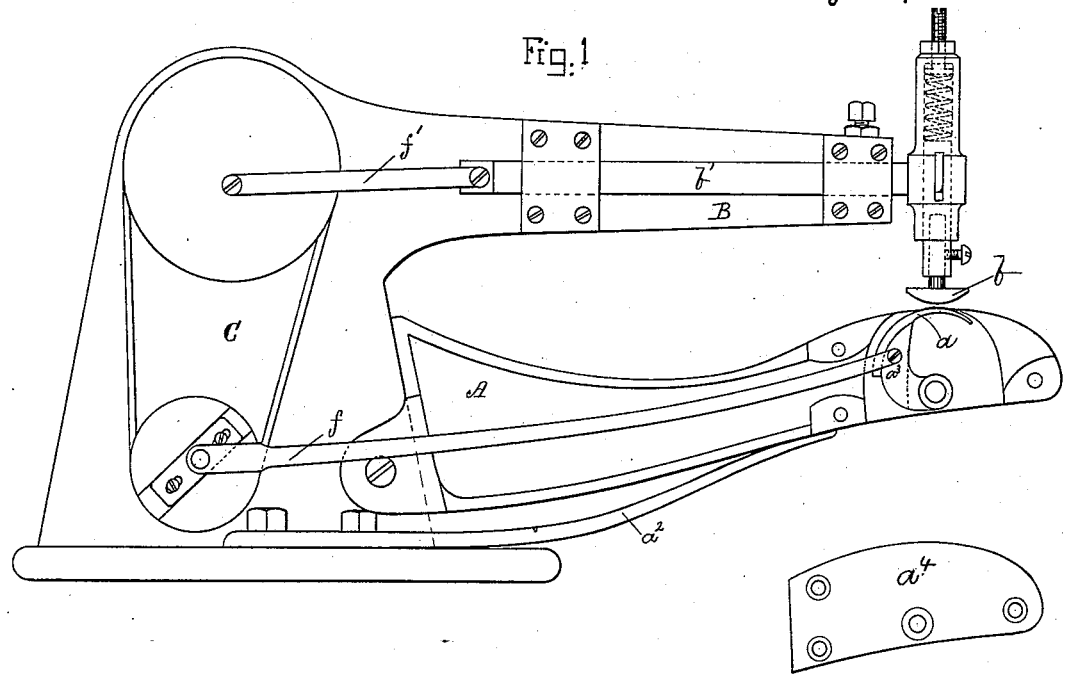
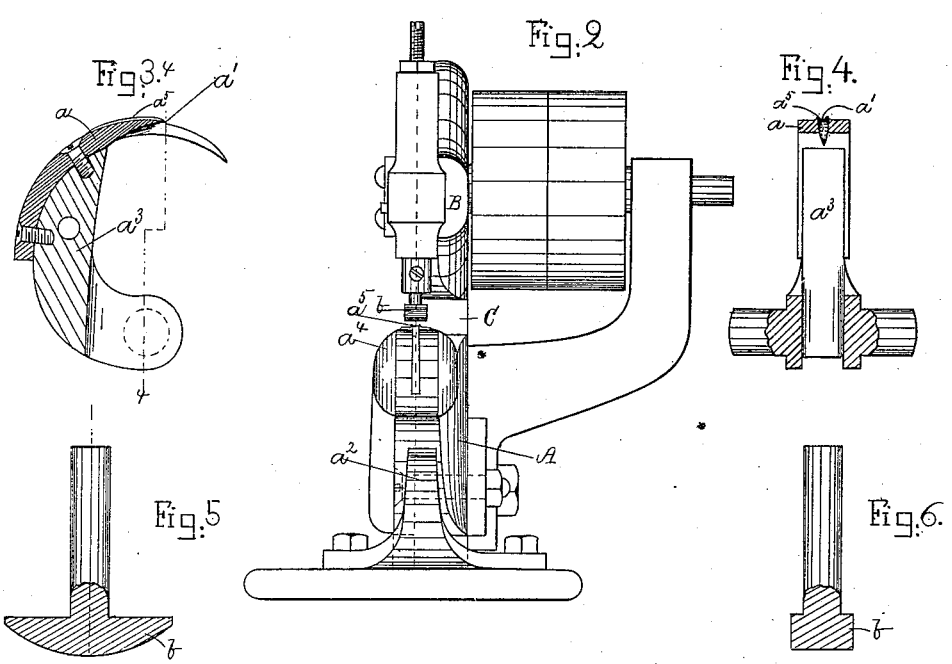
Witnesses
Lauritz N. Möller
Carl N. Möller
Inventor
Charles H. Helms
by J. E. Maynadier
his Atty.

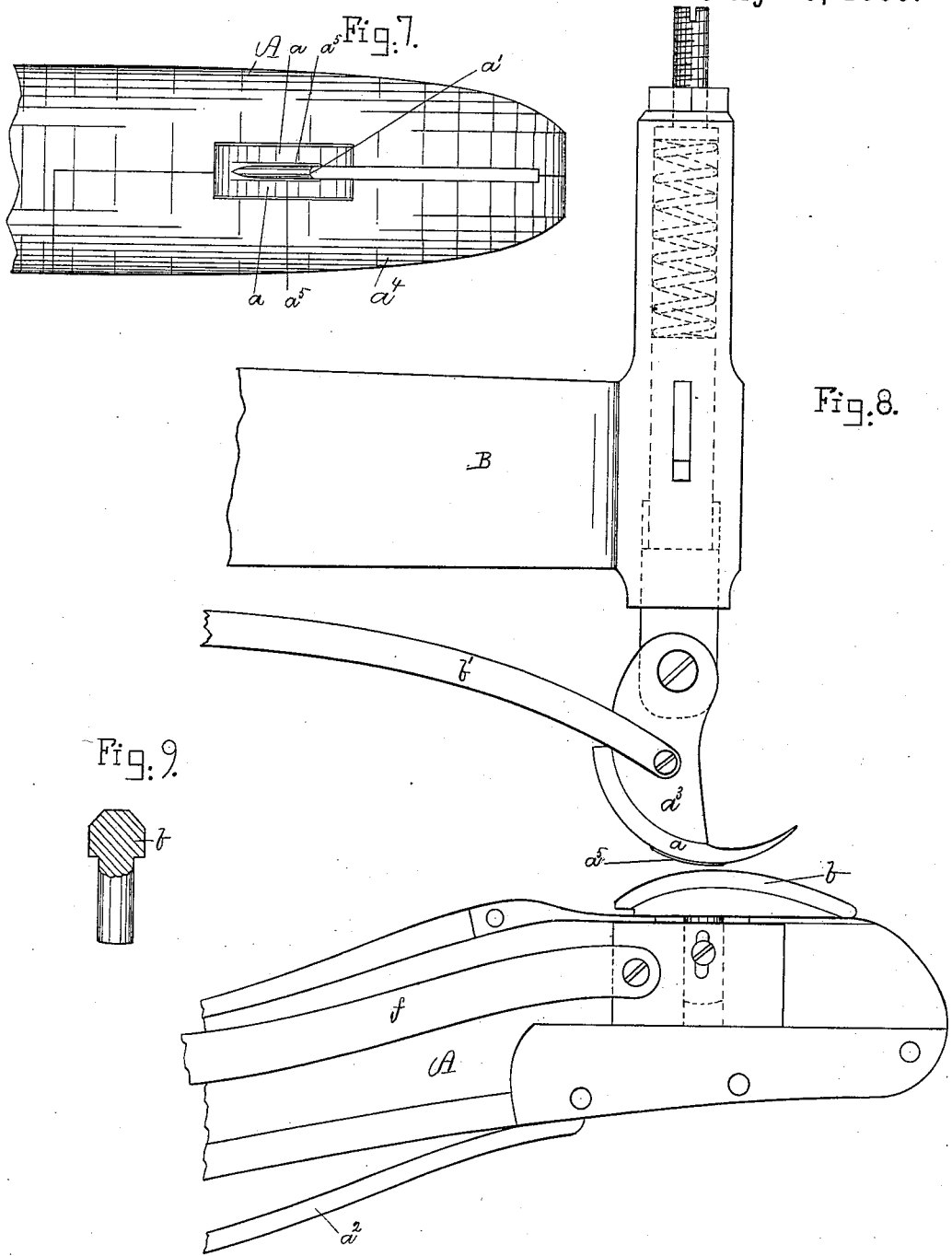

UNITED STATES PATENT OFFICE.

CHARLES HENRY HELMS, OF POUGHKEEPSIE, NEW YORK, ASSIGNOR TO GEORGE H. P. FLAGG, TRUSTEE, OF BOSTON, MASSACHUSETTS.

SEAM-TRIMMING MACHINE.

SPECIFICATION forming part of Letters Patent No. 345,303, dated July 13, 1886.

Application filed April 23, 1886. Serial No. 199,884. (No model.)

*To all whom it may concern:*

Be it known that I, CHARLES H. HELMS, of Poughkeepsie, in the county of Dutchess and State of New York, have invented a new and useful Seam-Finishing Machine, of which the following is a specification, reference being had to the accompanying drawings, making a part hereof, in which—

Figure 1 is a side view of my machine with the side plate removed. Fig. 2 is an end view of my machine; Fig. 3, a central longitudinal section of one of the rubbing-tools and its stock; Fig. 4, a sectional detail on line 4 4 of Fig. 3. Figs. 5 and 6 are views of one of the rubbing-tools, partly in section. Fig. 7 is a plan showing one of the rubbing-tools and a portion of its supporting-arm. Fig. 8 is a modification of my machine, and Fig. 9 a sectional view of a modified form of one of the rubbing-tools.

My machine consists of two arms, A and B, each of which carries a reciprocating rubber, $a\ b$, the arms being connected with a suitable frame, C, carrying operating mechanism, by which the rubbers are rapidly reciprocated. For certain kinds of seams both rubbers may have faces which are segments of cylinders or of any other usual shape in seam-rubbing machines; but when the machine is to be adapted also for taking out the welt of welted seams one of the rubbers should carry a welt-knife, $a'$, as shown in the drawings, and this combination of the reciprocating rubber $a$ and welt-knife $a'$ also constitutes one feature of my invention.

In that form of my machine shown in the drawings the arm A is hinged to frame C and held up in its normal place by the spring $a^2$, while the arm B is rigidly secured to or cast in one piece with the frame C. I have shown the rubber $a$ as fast to a stock, $a^3$, oscillating in trunnions which are journaled in the arm A and cap-piece $a^4$ in Figs. 1 and 2. Pitman $f$ serves to oscillate rubber $a$. Rubber $b$ is secured to slide $b'$, which is reciprocated by pitman $f'\ f'$. One of the rubbers is preferably mounted on a spring-stock in the usual manner for adjustment. In Figs. 1 and 2 the rubber $b$ is so mounted, while in Fig. 8 the rubber $a$ is upon the spring-stock. When seams without welts are to be finished, the acting surfaces of the rubbers may be of any usual shape; but when welted seams are to be finished one of the rubbers is provided with a welt-knife, and acts as a welt-knife in addition to its function as a rubber, as fully shown in Figs. 3, 4, and 7, where the rubber $a$ is a steel bar forked, as shown, and sharpened between the tines of the fork to form the welt-knife $a'$. A half-circle groove, $a^5$, extends back from the cutting-edge $a'$, and has its edges slightly raised above the upper surface of rubber $a$, for the purpose of rounding the edge of the welt, as will be clear from Figs 3 and 7. When one of the rubbers acts also as a welt-knife, I prefer to run it at a higher speed than the other and to give it a shorter stroke; but when both tools are rubbers merely it is desirable to gear them together, so that both have the same speed and the same length of stroke; but one moves from right to left while the other moves from left to right.

The main advantage of my invention is that the seam is rubbed on both sides, and so far as I know I am the first to attain this result in any way.

What I claim as my invention is—

1. In a seam-finishing machine, the rubbers $a$ and $b$, between which the seam is passed, and adapted by mechanism, substantially as described, to be reciprocated lengthwise of the seam, substantially as set forth.

2. In a seam-finishing machine, the rubber $a$, forked, as shown, and provided with the cutting-edge $a'$ and groove $a^5$, in combination with mechanism, substantially as described, for giving the rubber $a$ a reciprocating motion, all substantially as set forth.

3. A seam-finishing machine comprising frame C, arms A B, and reciprocating rubbers $a\ b$, arranged and operating substantially as described.

4. A seam-finishing machine comprising frame C, arms A B, and reciprocating rubbers $a\ b$, the rubber $a$ having the cutter $a'$, all arranged and operating substantially as described.

C. H. HELMS.

Witnesses:
EDWARD S. BEACH,
JOHN R. SNOW.